United States Patent [19]

Malachowsky et al.

[11] Patent Number: 4,945,497

[45] Date of Patent: Jul. 31, 1990

[54] METHOD AND APPARATUS FOR TRANSLATING RECTILINEAR INFORMATION INTO SCAN LINE INFORMATION FOR DISPLAY BY A COMPUTER SYSTEM

[75] Inventors: Chris Malachowsky, Santa Clara; Curtis Priem, Freemont, both of Calif.

[73] Assignee: Sun Microsystems, Inc., Mountain View, Calif.

[21] Appl. No.: 287,493

[22] Filed: Dec. 20, 1988

[51] Int. Cl.$^5$ .............................................. G06F 3/153

[52] U.S. Cl. .................................... 364/518; 340/747; 340/723

[58] Field of Search ....................... 364/518, 521, 522; 340/727, 724, 747, 723

[56] References Cited

U.S. PATENT DOCUMENTS

| | | | |
|---|---|---|---|
| 4,020,281 | 4/1977 | Davis, Jr. | 364/521 X |
| 4,459,676 | 7/1984 | Oguchi | 364/521 |
| 4,593,372 | 6/1986 | Bandai et al. | 364/521 X |
| 4,620,288 | 10/1986 | Welmers | 364/518 |
| 4,790,025 | 12/1988 | Inoue et al. | 340/724 X |
| 4,827,250 | 5/1989 | Stallkamp | 340/727 |
| 4,829,446 | 5/1989 | Draney | 364/518 X |

FOREIGN PATENT DOCUMENTS

| | | |
|---|---|---|
| 2215960A | 9/1989 | United Kingdom . |
| 2215961A | 9/1989 | United Kingdom . |

*Primary Examiner*—Gary V. Harkcom
*Assistant Examiner*—Michael A. Jaffe
*Attorney, Agent, or Firm*—Blakely, Sokoloff, Taylor & Zafman

[57] ABSTRACT

A circuit which computes the scan position of any pixel on the display as the sum of the number of scan lines multiplied by the number of pixels per scan line plus the number of pixels on the scan line to the particular position using an adder for a changing portion of the computation and an incrementer for a constant portion of the computation and combining the two of these to produce a result which accomplishes in a relatively economic fashion what would normally require an inordinate number of gates to obtain a variety of screen resolutions which are not simply powers of two multiples of one another.

8 Claims, 4 Drawing Sheets

FBC Linear Address Equations a=1024*y + x:

| | | | | | | | | | | | | | | | | | | | |
|---|---|---|---|---|---|---|---|---|---|---|---|---|---|---|---|---|---|---|---|
| | | | | | | | | | x10 | x9 | x8 | x7 | x6 | x5 | x4 | x3 | x2 | x1 | x0 |
| y9 | y8 | y7 | y6 | y5 | y4 | y3 | y2 | y1 | y0 | | | | | | | | | | |
| a19 | a18 | a17 | a16 | a15 | a14 | a13 | a12 | a11 | a10 | a9 | a8 | a7 | a6 | a5 | a4 | a3 | a2 | a1 | a0 |

/* Yx1024*/

FIG. 4A a=1152*y + x:

| | | | | | | | | | | | | | | | | | | | |
|---|---|---|---|---|---|---|---|---|---|---|---|---|---|---|---|---|---|---|---|
| | | | | | | | | | x10 | x9 | x8 | x7 | x6 | x5 | x4 | x3 | x2 | x1 | x0 |
| | | | y9 | y8 | y7 | y6 | y5 | y4 | y3 | y2 | y1 | y0 | | | | | | | |
| y9 | y8 | y7 | y6 | y5 | y4 | y3 | y2 | y1 | y0 | | | | | | | | | | |
| a19 | a18 | a17 | a16 | a15 | a14 | a13 | a12 | a11 | a10 | a9 | a8 | a7 | a6 | a5 | a4 | a3 | a2 | a1 | a0 |

/*Yx128*/
/*Yx1024*/

FIG. 4B a=1280*y + x:

| | | | | | | | | | | | | | | | | | | | |
|---|---|---|---|---|---|---|---|---|---|---|---|---|---|---|---|---|---|---|---|
| | | | | | | | | | x10 | x9 | x8 | x7 | x6 | x5 | x4 | x3 | x2 | x1 | x0 |
| | | y9 | y8 | y7 | y6 | y5 | y4 | y3 | y2 | y1 | y0 | | | | | | | | |
| y9 | y8 | y7 | y6 | y5 | y4 | y3 | y2 | y1 | y0 | | | | | | | | | | |
| a19 | a18 | a17 | a16 | a15 | a14 | a13 | a12 | a11 | a10 | a9 | a8 | a7 | a6 | a5 | a4 | a3 | a2 | a1 | a0 |

/*Yx256*/
/*Yx1024*/

FIG. 4C a=1600*y + x:

| | | | | | | | | | | | | | | | | | | | |
|---|---|---|---|---|---|---|---|---|---|---|---|---|---|---|---|---|---|---|---|
| | | | | | | | | | x10 | x9 | x8 | x7 | x6 | x5 | x4 | x3 | x2 | x1 | x0 |
| | | | | y9 | y8 | y7 | y6 | y5 | y4 | y3 | y2 | y1 | y0 | | | | | | |
| | y9 | y8 | y7 | y6 | y5 | y4 | y3 | y2 | y1 | y0 | | | | | | | | | |
| y9 | y8 | y7 | y6 | y5 | y4 | y3 | y2 | y1 | y0 | | | | | | | | | | |
| a19 | a18 | a17 | a16 | a15 | a14 | a13 | a12 | a11 | a10 | a9 | a8 | a7 | a6 | a5 | a4 | a3 | a2 | a1 | a0 |

/*Yx64*/
/*Yx512*/
/*Yx1024*/

FIG. 4D

METHOD AND APPARATUS FOR TRANSLATING RECTILINEAR INFORMATION INTO SCAN LINE INFORMATION FOR DISPLAY BY A COMPUTER SYSTEM

BACKGROUND OF THE INVENTION

1. Field of the Invention:

This invention relates to computer systems and, more particularly, to circuitry for converting coordinates stored in rectilinear coordinate systems into coordinates which may be conveniently used for scanning information to the output display of a computer system.

2. History of the Prior Art:

A major problem in utilizing computers to provide graphic displays is that for a single frame of graphical material to be presented on a cathode ray tube (CRT), it is necessary to store an indication of the information which is to be displayed for each position (pixel) of the cathode ray tube. With large and detailed displays, the number of pixels on the cathode ray tube may be approximately one thousand or greater in a horizontal direction and a like number in the vertical direction giving a total of approximately one million or more pixels about which information is to be stored. In a preferred system which is capable of providing a number of different colors on the cathode ray tube, each of these pixels contains eight bits of digital information specifying the particular color output. Consequently, approximately eight million bits of information needs to be stored for each frame to be presented at the output.

Not only does color information have to be provided for each pixel for each frame of the display, but in generating graphic displays, the usual method of determining the shapes of figures requires that various algorithms be applied to the geometric vertices of those figures. If this information is handled by the software of the system, computing the positions of each point to be displayed and determining the data to be displayed at that point shows the operation of the system to a point where operations such as animation are essentially impossible. For this reason, various systems utilizing hardware to speed the operation have been suggested. One method for speeding the operation is to use two output frame buffers, and load one while the other is being scanned to the display. Such a system significantly speeds the operation but requires essentially twice as much storage.

A new output display system has now been devised which utilizes a unique philosophy of graphic figure storage whereby high speed graphics may be realized using only a single output display buffer. The system, essentially, is based on a definition of a graphical figure (shape) which considers the shape to be composed of a number of subportions which are quadrilaterals. Circuitry is then provided for rapidly building quadrilateral images by handling only information regarding four vertices.

In providing such a hardware system to rapidly process information for a computer output display, it has been found convenient and substantially less time consuming to deal with the information regarding the address of the data to be presented on the display in rectilinear coordinates. On the other hand, the same data must be serially scanned to the cathode ray tube output display for convenient use. Most systems for translating such information themselves provide inordinate delays to the presentation of the graphics information. In order to eliminate these delays, hardware implementations of the software transfer algorithms have been utilized, but these require such large amounts of digital hardware that they have been economically unfeasible. Moreover, such systems have been able to handle either a single level of detail (resolution) on the display or some power of two representation of that level of detail.

It is, therefore, an object of the present invention to speed the operation of computer systems.

It is another object of the present invention to provide circuitry for handling in hardware the manipulations of graphical material which have in the usual case been handled by software of the computer system.

It is another object of this invention to provide a computer graphic display system capable of handling a number of different levels of detail (resolution) on a computer output display which levels are not simply variations of powers of two.

It is an additional object of the present invention to provide circuitry for scanning graphic information into a display register rapidly enough that a single buffer may be utilized for the display of animated programs.

A more particular object of the present invention is to provide circuitry for transforming coordinates represented in rectilinear form by X and Y values into values which may be scanned serially into a display buffer for ultimate display by a cathode ray tube or other output device.

SUMMARY OF THE INVENTION

These and other objects of the present invention are realized by circuitry which computes the scan position of any pixel on the display as the sum of the number of scan lines multiplied by the number of pixels per scan line plus the number of pixels on the scan line to the particular position.

The system utilizes an adder for a changing portion of the computation and an incrementer for a constant portion of the computation and combines the two of these to produce a result which accomplishes in a relatively economic fashion which would normally require an inordinate number of gates. By utilizing this combination of circuitry, a variety of screen resolutions may be obtained which are not simply powers of two multiples of one another. The circuit of the invention provides an extremely rapid input to a display buffer to accomplish the objects of the system.

These and other objects and features of the invention will become apparent to those skilled in the art by reference to the following detailed description taken together with the several figures of the drawing in which like elements have been referred to by like designations throughout the several views.

BRIEF DESCRIPTION OF THE DRAWINGS

FIG. 4(*a*)-(*d*) is a mathematical illustration of an arrangement for translating information from rectilinear to scan line coordinates.

NOTATION AND NOMENCLATURE

Figure 1:
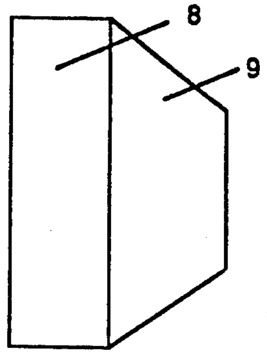
FIG. 1 is a representation of a graphical shape divided into two quadrilaterals which when individually displayed on a computer output device provide the complete original shape.
Figure 2A:
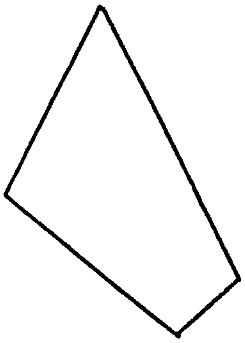
FIG. 2(*a*)-(*d*) is an illustration a single quadrilateral decomposed into line segments.
Figure 2C:
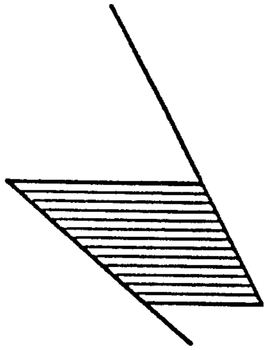
Figure 2B:
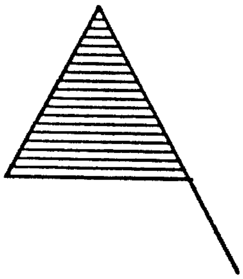
Figure 2D:
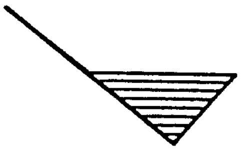

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DESCRIPTION OF THE PREFERRED EMBODIMENT

In designing computer systems, it has become apparent that the display of graphic images substantially slows the operation of most computers. This occurs because the amount of information that the computer must deal with for each frame to be presented on the output display is very large and because the manipulation of that information to present the graphics image requires inordinate use of the central processing unit (CPU).

The system of which the invention is a part reduces the delay inherent in the normal systems used for displaying computer graphics by handling most of the operations in hardware so that the information is available instantaneously. In order to allow the use of hardware to implement the presentation of graphics, it has been found that the information presented to the hardware must, as viewed by that hardware, appear to be of essentially the same nature no matter what the shape to be presented on the display. In this manner, decisional steps need not be taken to determine what type of information is involved, thereby increasing the processing time. This invention is part of a system which is based on breaking the graphics images to be presented into quadrilaterals all of which may be handled in the same manner by the graphics presentation hardware and recombined on the display to present the desired shape. The system decomposes these quadrilaterals into pairs of line segments each of which subtend the same output display scan lines. Thus, each quadrilateral is decomposed into a series of line segment pairs which define the minimum set of trapezoids required to properly reconstruct the quadrilateral in the display memory. The X and Y coordinates of the two ends of each scan line between the line segments are then determined.

The invention translates rectilinear coordinates into serial scan line positions which allow the data relating to these positions to be stored in a frame buffer and displayed on an output display. This is accomplished in hardware so that an insignificant delay occurs in the translation and the output to the display is not delayed.

FIG. 1 is a representation of a graphical shape divided into two quadrilaterals which when individually displayed on a computer output device provide the complete original shape. Although the shape shown in FIG. 1 is simple, it will be apparent to those skilled in the art that shapes of essentially infinite complication may be represented if a sufficiently large number of small individual quadrilaterals are chosen. In fact, the system of the present invention has been utilized to represent three dimensional animated shapes of a very complicated nature.

Figure 3:
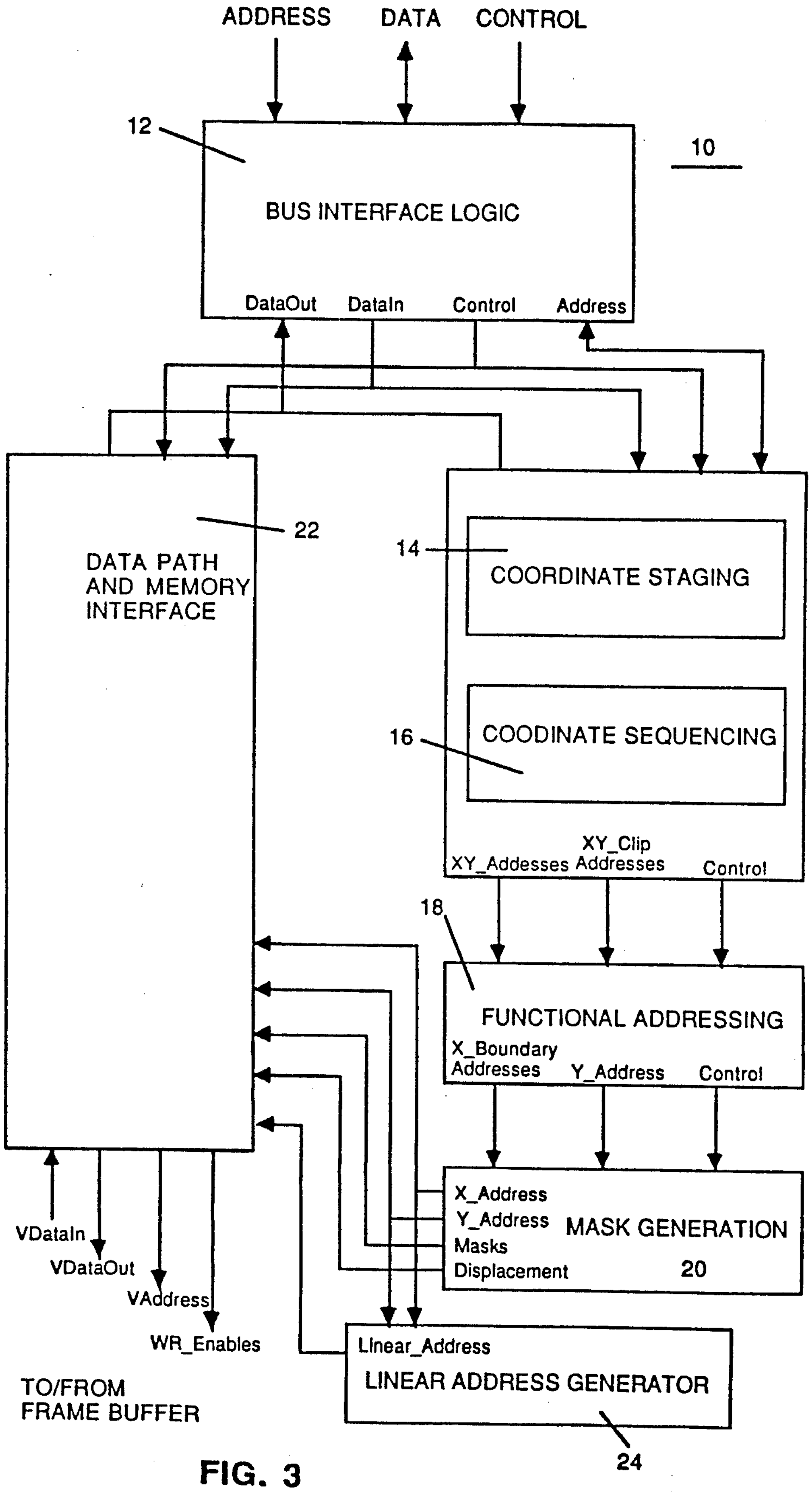
FIG. 3 is a block diagram illustrating a graphical output system for a computer which may include circuitry constructed in accordance with the invention.

FIG. 3 illustrates in block diagram form a graphical output system 10 constructed in accordance with the invention which may be used with a general purpose computer system. The system 10 includes bus interface logic 12 which receives information regarding the desired graphical shape from the computer system (not shown in the figures). The bus interface logic 12 receives information on an address line which designates the particular portion of the system 10 to which the input is to be transferred. The bus interface logic 12 receives the actual data such as the color description on input data lines. The bus interface logic 12 also receives a control signal designating the manner in which the information is to be treated on a control line.

When constructing graphical representations from quadrilaterals in accordance with the present invention, the input information includes the coordinates of a particular clip window in which the information is to appear, the coordinates (vertices) of the quadrilateral to be described, and color data regarding each quadrilateral. The color information which is to be presented at the display of the quadrilateral is stored in a data path and memory interface stage 22. The vertices of the quadrilateral to be described and the clip window are stored in coordinate staging circuitry 14 which includes hardware that provides comparisons of the incoming information by means well known to the prior art such as registers, magnitude comparators, and gating circuits.

The comparisons made include the comparison of each X value of each vertex of the quadrilaterals to each other X value of each of the other vertices of the quadrilateral, the comparison of each Y value of each vertex of the quadrilateral to each other Y value of each of the other vertices of the quadrilateral, and the comparison of each of these X and Y values of the vertices to the edges of the clip window in which the information is the be presented. Since this is accomplished by hardware, the information is immediately available for use by the system 10 without reference of any of the information to the CPU or any loss of any system clock time.

The information regarding the vertices of the quadrilateral and the clip window available at the coordinate staging circuitry 14 is presented to a coordinate sequencing stage 16 at which the quadrilateral is decomposed into a series of subportions each of which comprise two line segments of the original quadrilateral. Each of these subportions is chosen such that the line segments define an area of the quadrilateral which may be drawn by a series of parallel horizontal scan lines, each defined by an X beginning value laying on one of the line segments and an X ending value lying on the other. In essence, the two line segments of each subportion define as many Y (horizontal) scan lines as is as possible in view of the shape of the quadrilateral. When all of the scan lines of all of the subportions are rendered on the display, the quadrilateral is defined in total.

FIG. 2(*a*)–(*d*) illustrates a single quadrilateral divided into subportions in accordance with this invention. The quadrilateral which is decomposed is shown in FIG. 2(*a*), and the subportions thereof are illustrated in FIG. 2(*b*)–(*d*). As may be seen in FIG. 2, each subportion includes, when presented on an output display, a series of horizontal scan lines which begin at one line segment defining the quadrilateral and end at another line segment. The scan lines for each subportion of the quadrilateral represent a trapezoidal portion of the original quadrilateral. When these horizontal lines of all of the trapezoidal subportions are scanned to the frame buffer for presentation on the output display, the entire quadrilateral shape is reconstituted on the display.

Referring again to FIG. 3, after the quadrilaterals have been decomposed into subportions in accordance with this invention, the individual scan lines have their beginning and ending X values determined at a functional addressing stage 18. In the preferred embodiment of the invention, this is accomplished by the use of circuitry which determines for each line segment pair the particular pixels constituting the X values at the beginning and end of each scan line within the decomposed subportions of the quadrilateral. This functional addressing stage 18 also accomplishes the necessary clipping to fit the particular quadrilaterals to the top and bottom and the left and right of the clip windows, and then transfers the signals to a mask generation stage 20 which arranges the information into sixteen pixel portions that traverse from the beginning to the end of the visible portion of each quadrilateral for each scan line and are used for addressing the data path and memory interface stage 22.

The mask generation signals are also furnished to a linear address generator 24 which translates the addresses provided by the mask generation stage 20 into signals for linearly addressing the frame buffer for the output display. It is the circuitry of this linear address generator which is the subject of this invention. The invention considered by this specification relates to the apparatus and method of translating the addresses available at the mask generation stage 20 into addresses which may be utilized to serially scan the color data into the frame buffer and the output display. This circuitry allows such translation to be accomplished by the use of a minimum of gating circuitry. Moreover, the circuitry of this invention accomplishes this while providing a number of levels of resolution which are not simply multiple powers of two.

At this point, the color data relating to the quadrilateral to be displayed which has been held in memory at the stage 22 is transferred to the display buffer.

Various portions of the system above described are more particularly described in the following patent applications, all of which were filed on the filing data of this patent application and are assigned to the assignee hereof:

Ser. No. 07/297,475, filed Jan. 13, 1989, HARDWARE IMPLEMENTATION OF CLIPPING AND INTER-COORDINATE COMPARISON LOGIC, Malachowsky and Priem; Ser. No. 07/297,604, filed Jan. 13, 1989, APPARATUS AND METHOD FOR PROCESSING GRAPHICAL INFORMATION TO MINIMIZE PAGE CROSSINGS AND ELIMINATE PROCESSING OF INFORMATION OUTSIDE A PREDETERMINED CLIP, Malachowsky and Priem; Ser. No. 07/297,093, filed Jan. 13, 1989, APPARATUS AND METHOD FOR USING A TEST WINDOW IN A GRAPHICS SUBSYSTEM WHICH INCORPORATE HARDWARE TO PERFORM CLIPPING OF IMAGES, Malachowsky and Priem; Ser. No. 07/297,590, filed Jan. 13, 1989, APPARATUS AND METHOD FOR LOADING COORDINATE REGISTERS FOR USE WITH A GRAPHICS SUBSYSTEM UTILIZING AN INDEX REGISTER, Malachowsky and Priem; Ser. No. 07/287,392, filed Dec. 20, 1988, METHOD AND APPARATUS FOR SORTING LINE SEGMENTS FOR DISPLAY AND MANIPULATION BY A COMPUTER SYSTEM, Malachowsky and Priem; Ser. No. 07/286,997, field Dec. 20, 1988, METHOD AND APPARATUS FOR DETERMINING LINE POSITIONS FOR DISPLAY AND MANIPULATION BY A COMPUTER SYSTEM, Malachowsky and Priem; and Ser. No. 07/287,128, filed Dec. 20, 1988, METHOD AND APPARATUS FOR DECOMPOSING A QUADRILATERAL FIGURE FOR DISPLAY AND MANIPULATION BY A COMPUTER SYSTEM, C. Malachowsky.

In order to translate from rectilinear coordinates designated in X and Y values, the number of pixels on each Y scan line (the X resolution) are multiplied by the Y value; and this amount is added to the particular X value. The total is the serial value from the beginning of the scan at the top left of the output display (the rectilinear position at which X=0 and Y=0). For example, FIG. 4(*a*)–(*d*) illustrates the mathematics of accomplishing this determination. FIG. 4(*a*) illustrates the method of arriving at the scan line value for a pixel when the display resolution is 1024 bits per scan line. The Y value (the number of the scan line itself) is multiplied by 1024. In a binary system, this multiplication is accomplished simply by shifting the Y value by nine bits to the left and shifting zeroes into the empty bit positions on the right. This value is then furnished to the adder circuitry as one input. A second input to the adder is the X value of the pixel. When added, the output is the scan line position of the pixel of interest. The normal method for implementing such an arrangement utilizes shift registers and adders composed of gating circuitry because it is not economical to provide an actual multiplier for the linear address calculation. It is, therefore, the usual practice to generate the multiplication by a series of additions utilizing easily obtainable powers of two multiples of the multiplicand.

Thus, when different resolutions are desired for the output display and these resolutions are variations by a power of two of the base resolution, it is a simple matter to shift the Y value provided for the pixel by one or more bits in either direction to reach the correct multiplier. In this manner, resolutions of 512 and 2048 may easily provided on the same display. However, as resolutions of output displays improve, the use of lower resolutions is waning with sophisticated programs and the ability of the display to provide the higher resolution (an order of magnitude increase in resolution with a power of two increase in pixels per scan line) may also be in doubt. Consequently, the ability to provide more than one or two resolutions using this output method is also unlikely.

The system of the present invention is able to provide display resolutions of 1024, 1152, 1280, and 1600 pixels per scan line, much more useful resolutions than the power of two resolutions which may be attained with presently available displays. FIGS. 4(*b*)-(*d*) illustrate the mathematics of providing such display resolutions. FIG. 4(*b*), for example, illustrates that to realize a resolution of 1152 pixels per scan line, the Y value may be multiplied by 1024, and added to the Y value multiplied by 128, and added to the X value. This requires an adder with three inputs. Fig. 4(*c*) illustrates that to realize a resolution of 1280 pixels per scan line requires that the Y value be multiplied by 1024, added to the Y value multiplied by 256, and added to the X value. This also requires an adder with three inputs. Fig. 4(*d*) illustrates that to realize a resolution of 1600 pixels per scan line requires that the Y value be multiplied by 1024, added to the Y value multiplied by 512, added to the Y value multiplied by 64, and added to the X value. This requires an adder with four inputs. Such adders are not available which are commercially feasible. To provide such an adder would require such a large number of gates that is questionable whether such an arrangement could be realized.

The circuitry of the present invention obviates the necessity of such an adder. The circuitry utilizes a different method of realizing the addition necessary to provide the serial output. The circuitry utilizes an incrementer circuit instead of an adder for realizing the 1024 resolution input thereby substantially reducing the number of inputs necessary and allowing the use of a three input adder to accomplish all of the necessary additions. That an incrementer may be used for this purpose is not obvious. However, viewing the mathematical arrangements of FIG. 4(*a*)-(*d*) illustrates that the addition of the X value and the Y value multiplied by 1024 which is present for each resolution may be accomplished by simply adding the highest bit of X to the lowest significant bit of the Y multiplied by 1024 and thus allowing the Y value to be incremented if a "one" is present at that highest bit of the X value. An incrementer can easily accomplish this operation.

Figure 5:
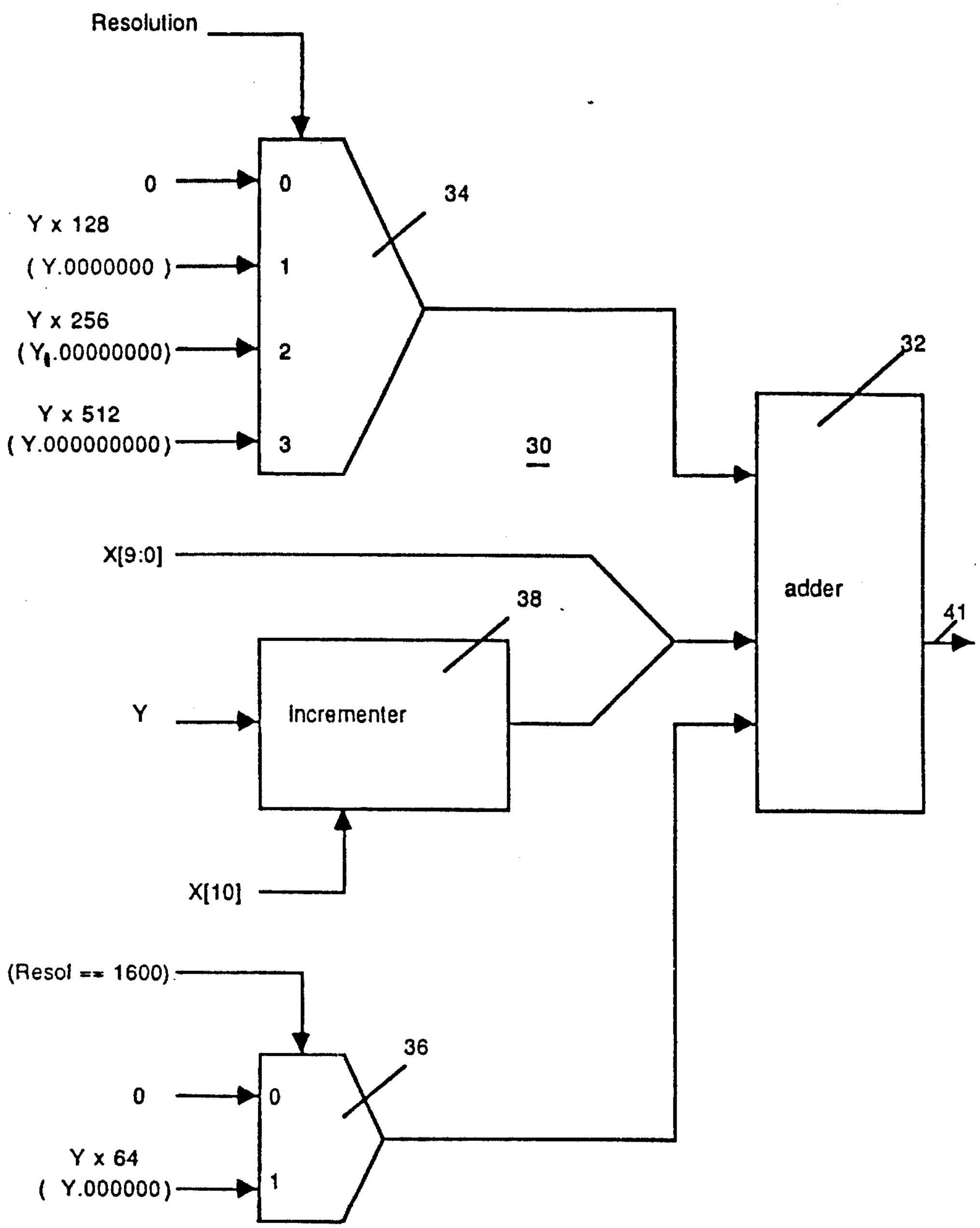
FIG. 5 is a block diagram of circuitry illustrating on method for implementing the invention.

FIG. 5 illustrates a preferred circuit 30 which may be utilized to realize the invention. The circuit 30 includes an adder 32 which receives inputs on three different lines. The upper line to the adder 32 shown in FIG. 5 is the output from a multiplexer 34 which selects an input on one of four input lines. These four lines are zero, Y multiplied by 128, Y multiplied by 256, and Y multiplied by 512. It should be noted that a power of two multiplication implied by these inputs may be simply accomplished by a shift left with zeroes provided to fill the empty bits from the right. This may be accomplished in hardware by simply grounding a number of lower valued lines to accomplish the zero fill at the appropriate bit positions. The value is selected by a signal to the multiplexer 34 which depends on the resolution desired.

The lower line shown in FIG. 5 to the adder 32 is the output from a multiplexer 36 which selects the input on one of two lines. These two lines are zero and Y multiplied by 64. The value is also selected by a signal to the multiplexer 36 which depends on the resolution desired.

The middle input to the adder is provided by an incrementer 38 which receives the Y value and the high bit input from the X value. Depending on the X bit value, the Y value is or is not incremented. If the X bit value is a one, then the Y value has its lowest bit incremented, and all other bits which receive carries through the incrementing operation are also incremented. If the X bit value is a zero, then the Y value is not changed. This result is simply appended to the high end of the value of the first ten bits of the X value (the zero through nine bit positions) and produces at the input to the adder 32 a result which is equal to the sum of the Y value multiplied by 1024 plus the X value.

To reach any of the resolutions, the appropriate resolution is provided as input to the two multiplexors 34 and 36. If the resolution is 1024, for example, the multiplexer 34 provides zero as its output, the multiplexer 36 provides zero as its output, and the incrementer 38 provides the Y incremented value to be appended to the first ten bits of the X value to give the entire result, i.e., the 1024 resolution multiplied by the Y value plus the X value.

If the resolution is 1152, on the other hand, the multiplexer 34 provides Y multiplied by 128 as its output, the multiplexer 36 provides zero as its output, and the incrementer 38 provides the Y incremented value to be appended to the first ten bits of the X value to give the result, i.e., the Y value multiplied by 1024 plus the Y value multiplied by 128 plus the X value.

If the resolution is 1280, the multiplexer 34 provides Y multiplied by 256 as its output, the multiplexer 36 provides zero as its output, and the incrementer 38 provides the Y incremented value to be appended to the first ten bits of the X value to give the entire result, i.e., the Y value multiplied by 1024 plus the Y value multiplied by 256 plus the X value.

If the resolution is 1600, the multiplexer 34 provides Y multiplied by 512 as its output, the multiplexer 36 provides Y multiplied by 64 as its output, and the incrementer 38 provides the Y incremented value to be appended to the first ten bits of the X value to give the entire result, i.e., the Y value multiplied by 1024 plus the Y value multiplied by 512 plus the Y value multiplied by 64 plus the X value.

The circuit shown in FIG. 5 is realizable with circuitry presently available. It utilizes an adder with but three inputs which is attainable economically at the present state of the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

We claim:

1. An apparatus for translating addresses corresponding to rectilinear coordinates of a plurality of scan line masks generated by a mask generator into addresses for a linear memory interface for the rapid display of an image on an output display, comprising:

an adder coupled to said linear memory interface for providing a plurality of resolutions upon which said scan line masks may be displayed on said output display;

first circuit means connected to said adder for providing a first input thereto, said first circuit means being coupled to said mask generator for receiving a Y rectilinear value therefrom, said first circuit means being further provided with an input indicative of a desired resolution for said output display;

second circuit means coupled to said adder for providing a second input thereto, said second circuit means being coupled to said mask generator for receiving a Y rectilinear value therefrom, said second circuit being further provided with an input indicative of a desired resolution for said output display; and third circuit means coupled to said mask generator for providing a third input to said adder, said third circuit means being coupled to said mask generator for receiving a Y rectilinear value and the highest bit value of a X rectilinear value therefrom, said third input being provided with the value of the first ten bits of a X rectilinear coordinate.

2. An apparatus as defined in claim 1, wherein said resolutions are other than a power of two multiple of said resolution.

3. An apparatus as defined in claim 1, wherein said first circuit means is a multiplexer, said multiplexer providing a multiple of said Y rectilinear value as said first input to said adder.

4. An apparatus as defined in claim 1, wherein said second circuit means is a multiplexer, said multiplexer providing a multiple of said Y rectilinear value as said second input to said adder.

5. An apparatus as defined in claim 1, wherein said third circuit means is an incrementer, said incrementer providing a multiple of said Y rectilinear value as part of said third input to said adder.

6. An apparatus as defined in claim 1, wherein said Y rectilinear value comprises the Y rectilinear coordinate of said scan line describing said image.

7. An apparatus as defined in claim 1, wherein said X rectilinear value comprises the left most x-coordinate of said scan line describing said image.

8. The third input as defined in claim 1 further comprises a sum of said X rectilinear value and a multiple of said Y rectilinear value.

* * * * *

UNITED STATES PATENT AND TRADEMARK OFFICE

CERTIFICATE OF CORRECTION

PATENT NO. : 4,945,497

DATED : July 31, 1990

INVENTOR(S) : Malachowsky, et. al.

It is certified that error appears in the above-identified patent and that said Letters Patent is hereby corrected as shown below:

| | | |
|---|---|---|
| col. 01, line 40 | delete "shows" | insert --slows-- |
| col. 01, line 58 | before "four" | insert --the-- |
| col. 02, line 41 | delete "which" | insert --what-- |
| col. 04, line 26 | after "translates" | insert --those-- |
| col. 05, line 24 | delete "laying" | insert --lying-- |
| col. 06, line 17 | delete "data" | insert --date-- |
| col. 06, line 43 | delete "field" | insert --filed-- |

Signed and Sealed this

Twenty-ninth Day of December, 1992

*Attest:*

DOUGLAS B. COMER

*Attesting Officer* *Acting Commissioner of Patents and Trademarks*